UNITED STATES PATENT OFFICE.

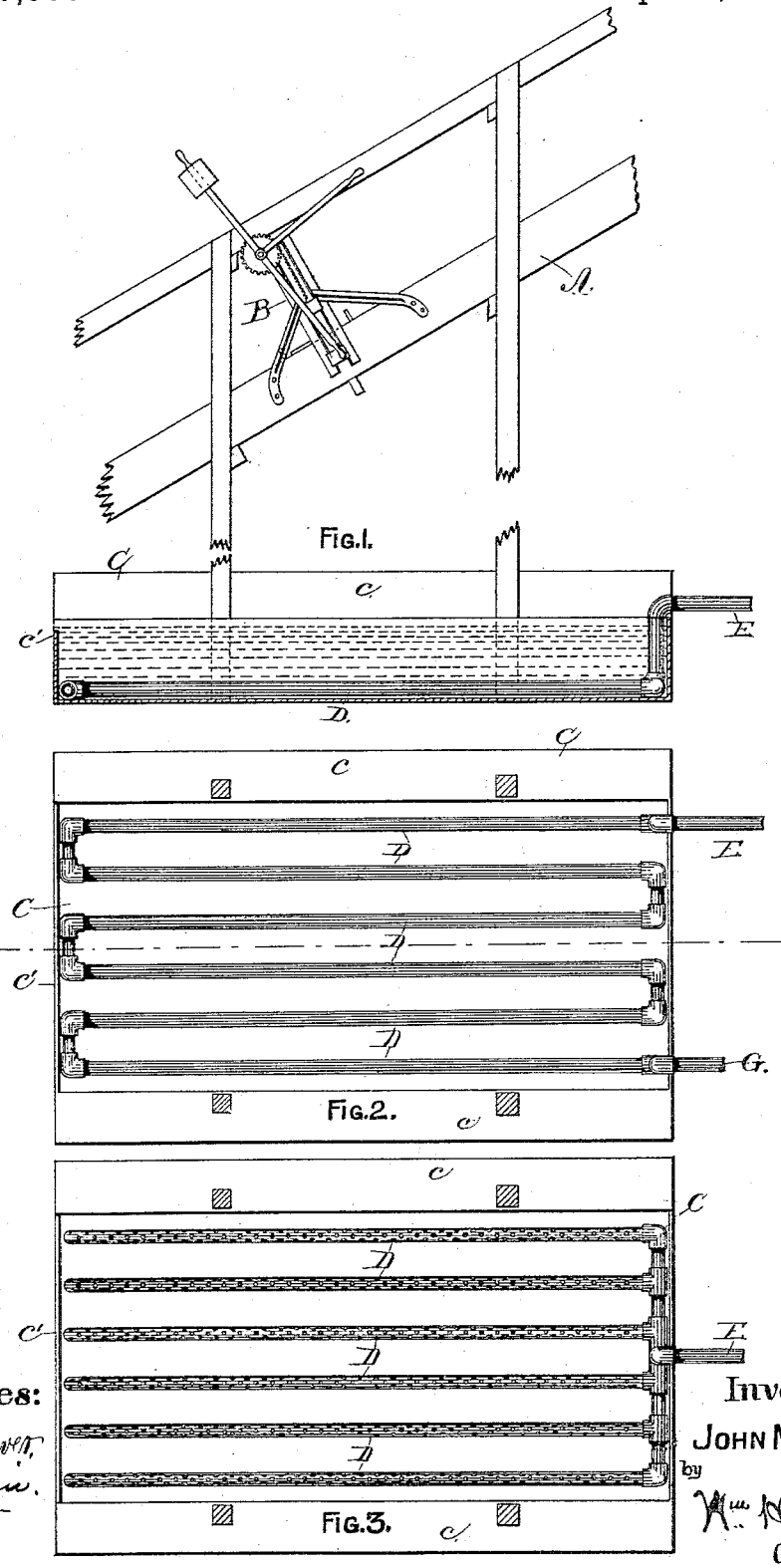

JOHN N. BRIGGS, OF COEYMANS, NEW YORK.

ICE AND SLUSH MELTING ATTACHMENT.

SPECIFICATION forming part of Letters Patent No. 369,389, dated September 6, 1887.

Application filed December 29, 1886. Serial No. 222,953. (No model.)

*To all whom it may concern:*

Be it known that I, JOHN N. BRIGGS, of Coeymans, in the county of Albany and State of New York, have invented new and useful Improvements in Waste Ice and Slush Melting Attachments for Ice-Elevators, of which the following is a specification.

My invention relates to an attachment to ice-elevators on which the cakes of ice are planed or scraped; and the object of my invention is to provide an apparatus that will melt the waste ice and slush which are removed from the surface of the cakes. This object I attain by means of the apparatus illustrated in the accompanying drawings, which are herein referred to and form part of this specification, and in which—

Figure 1 is a side elevation of part of an ice elevator and planer with my apparatus shown in vertical section applied thereto; Fig. 2, a plan view of my ice-melting attachment; and Fig. 3 a modified form of the latter.

One of the greatest troubles in the operation of harvesting and storing ice which undergoes the process of planing upon the elevator before it is stored is the accumulation of ice chips and slush which fall from the planing mechanism, and the removal of which has always involved a great expense for time and labor. By my invention, in which the ice chips and slush are melted by falling into heated water, this trouble is remedied.

As represented in the drawings, A is an inclined ice-elevator for raising cakes of ice into the houses prepared for storing them, and is of a form commonly used for that purpose; B, a planing device or scraper erected on said elevator; C, the melting pan or trough, made in the form of an open-top box sufficiently tight to hold water and fixed in a horizontal position underneath the elevator A, and preferably directly under the planing device B. Said melting-pan contains a series of steam-pipes, D, through which, in the arrangement shown in Figs. 1 and 2, steam circulates continuously for the purpose of heating the water contained in the pan C by means of radiant heat; but, as shown in Fig. 3, the pipes D are perforated, so as to permit the steam that flows into said pipes to escape through the perforations and by mingling with the water contained in said pan heat said water to the required temperature.

The steam-pipes D are supplied with steam through the supply-pipe E, which, when live steam is to be used for the purpose of heating the water, should be connected directly to a steam-boiler; but when preferred the supply-pipe E may be connected with the exhaust-opening of a steam-engine, so that the exhaust-steam therefrom may be utilized for the purpose of heating the water; or, when preferred, live steam from the boiler may be mixed with the exhaust-steam from the engine for supplying the pipes with steam, for the purpose set forth. The waste-pipe G (shown in Fig. 2) is only employed when live steam alone is used, and it connects the steam-pipes D with the water-space of the steam-boiler or with an automatic steam-trap commonly used for such purposes. The melting-pan C is preferably made with wings c, which flare upwardly from the top of said pan, so as to catch any chips of ice or slush which may fall outside of the body of said pan and guide them into the heated water.

The operation of my apparatus is as follows: The pan C is filled with water, and the temperature of the latter is raised by heat from the steam-pipes D to a point sufficiently high to melt the ice chips or slush falling into it. Cakes of ice are carried up the elevator A by the machinery commonly employed for that purpose, and as said cakes are moved under the planing or scraping device B they are reduced to the required thickness. The chips of ice or slush removed from the cakes by the planing device which fall into the hot water contained in the melting-pan C are quickly melted, and the surplus water produced therefrom runs over the end $c'$ of the pan, which should be made slightly lower than the other parts, as shown in Fig. 1; and as long as the apparatus is in operation the pan will remain filled with water to the height of said end piece. The waste water which passes over the end of the pan may be conducted through drains or pipes to any point required.

I am aware that inclined slush-melting pans having perforated steam-pipes have heretofore been constructed for the purpose of melting slush by the direct action of steam, the water being allowed to escape freely from the lower end of said pan, which is left open for that purpose. I do not claim such an apparatus; but

I claim as my invention—

The herein-described apparatus, comprising an ice-elevator and a melting-pan fixed in a horizontal position adjacent to the ice-elevator, where the waste ice, chips, and slush from said elevator will fall thereinto, the said melting-pan being provided with steam-heating pipes, whereby the water contained in said pan will be maintained at an ice-melting temperature, all of said parts being constructed and arranged to operate as and for the purpose herein specified.

JOHN N. BRIGGS.

Witnesses:
WM. H. LOW,
S. B. BREWER.